United States Patent [19]

Nomura

[11] 4,332,311
[45] Jun. 1, 1982

[54] SHOE HOLD-DOWN DEVICE IN A DRUM BRAKE

[75] Inventor: Yoshihisa Nomura, Toyota, Japan

[73] Assignee: Toyota Jidosha Kogyo Kabushiki Kaisha, Toyota, Japan

[21] Appl. No.: 149,749

[22] Filed: May 14, 1980

[30] Foreign Application Priority Data

Jun. 12, 1979 [JP] Japan .......................... 54/80075[U]
Jun. 16, 1979 [JP] Japan .......................... 54/82590[U]

[51] Int. Cl.³ ............................................ F16D 65/09
[52] U.S. Cl. .................................................. 188/340
[58] Field of Search ....................... 188/335, 340, 216

[56] References Cited

U.S. PATENT DOCUMENTS 3,294,201 12/1966 Swift ............................... 188/340 X

FOREIGN PATENT DOCUMENTS 1438924 4/1966 France ............................ 188/216

Primary Examiner—Duane A. Reger
Attorney, Agent, or Firm—Stevens, Davis, Miller & Mosher

[57] ABSTRACT

A drum brake wherein a pair of brake shoes are held down, without departing from a backing plate, by means of a single shoe hold-down spring. The spring is made of a wire, being bent and wound symmetrically about an axis, and held by retainers secured to the backing plate, so as not to be substantially hampered from swinging about the axis; it is contacted to the pair of shoes at a pair of farthest distant symmetrical points from the axis. The contacting load at the pair of points with the shoes is naturally equalized or balanced, because the spring is not substantially hampered from swinging about the axis.

11 Claims, 6 Drawing Figures

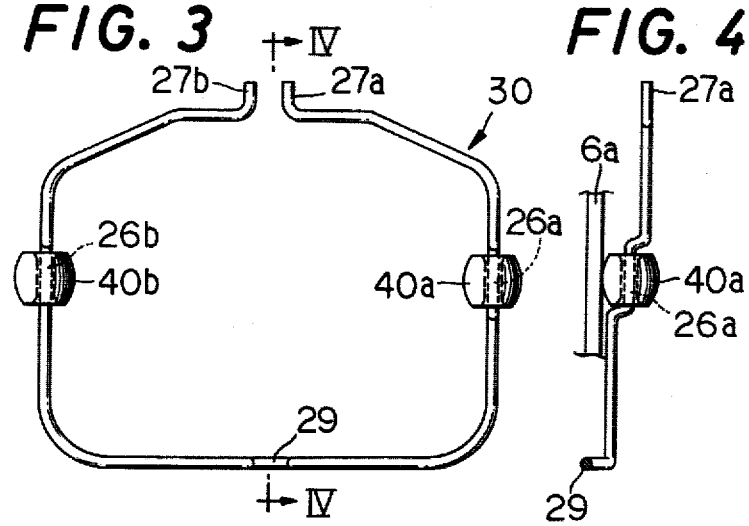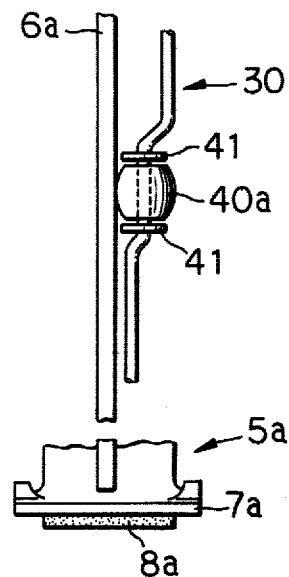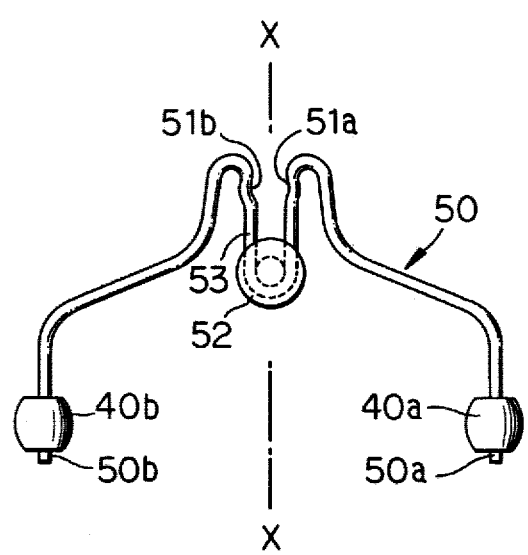

SHOE HOLD-DOWN DEVICE IN A DRUM BRAKE

FIELD OF THE INVENTION

This invention relates to a shoe hold-down device employed in a drum brake for holding down a pair of brake shoes on a backing plate.

BACKGROUND OF THE INVENTION

Many types of shoe hold-down devices are used in the conventional drum brakes. Satisfactory ones, however, with respect to several preferable conditions such as: (a) easiness in avoiding interference with neighboring parts, for example, a parking lever, (b) easiness in assemblying or attaching in place, (c) balanced load of shoe holding down to each of the shoes, etc., are rarely found at present.

SUMMARY OF THE INVENTION

This invention was made from such a background. The primary object of this invention is to provide a shoe hold-down device which is able to attain the above-mentioned objects (a), (b), (c), etc. to the greatest extent.

Another object of this invention is to provide a shoe hold-down device which is able to avoid such an undesirable state as much as possible that the shoes are being pressed to the inside surface of the brake drum, during the non-braking operation time.

Still another object of this invention is to provide a shoe hold-down device wherein the spring is subjected to rare chance of getting out of place for its easiness of attaching.

Further object of this invention is to provide a shoe hold-down device as simple in structure and as low in manufacturing cost as possible.

BRIEF DESCRIPTION OF THE DRAWINGS

FIG. 3 is an elevational view of a shoe hold-down spring employed in another embodiment of this invention;

FIG. 4 is a sectional view taken along the section line IV—IV in FIG. 3;

FIG. 5 is a profile of an essential part of another embodiment of this invention; and FIG. 6 is an elevational view of a shoe hold-down spring employed in still another embodiment.

DETAILED DESCRIPTION OF THE PREFERRED EMBODIMENTS

With reference to the appended drawings detailed description of preferred embodiments will be made hereunder.

Figure 1:
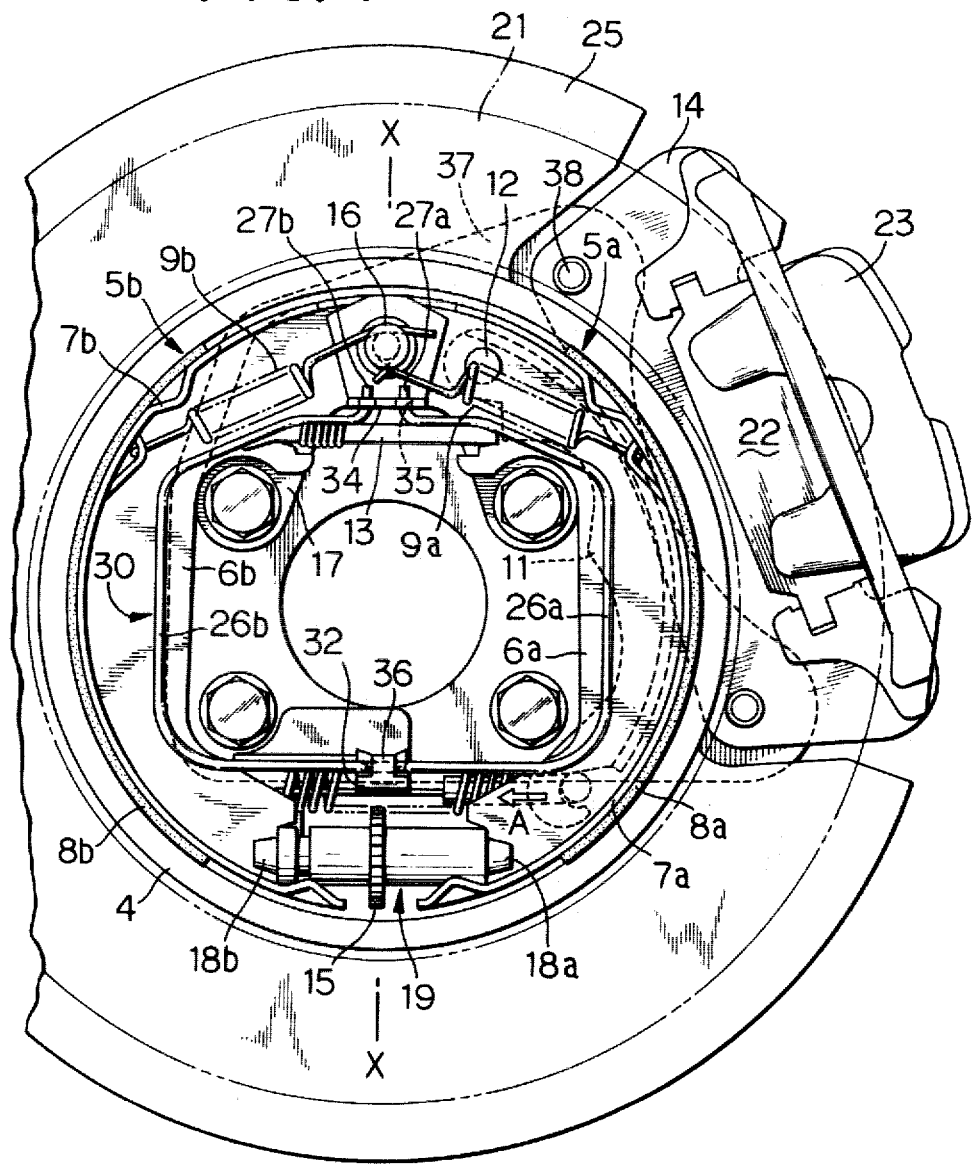
FIG. 1 is an elevational view of a drum-in disc brake provided with an embodiment of a shoe hold-down device in accordance with this invention.
Figure 2:
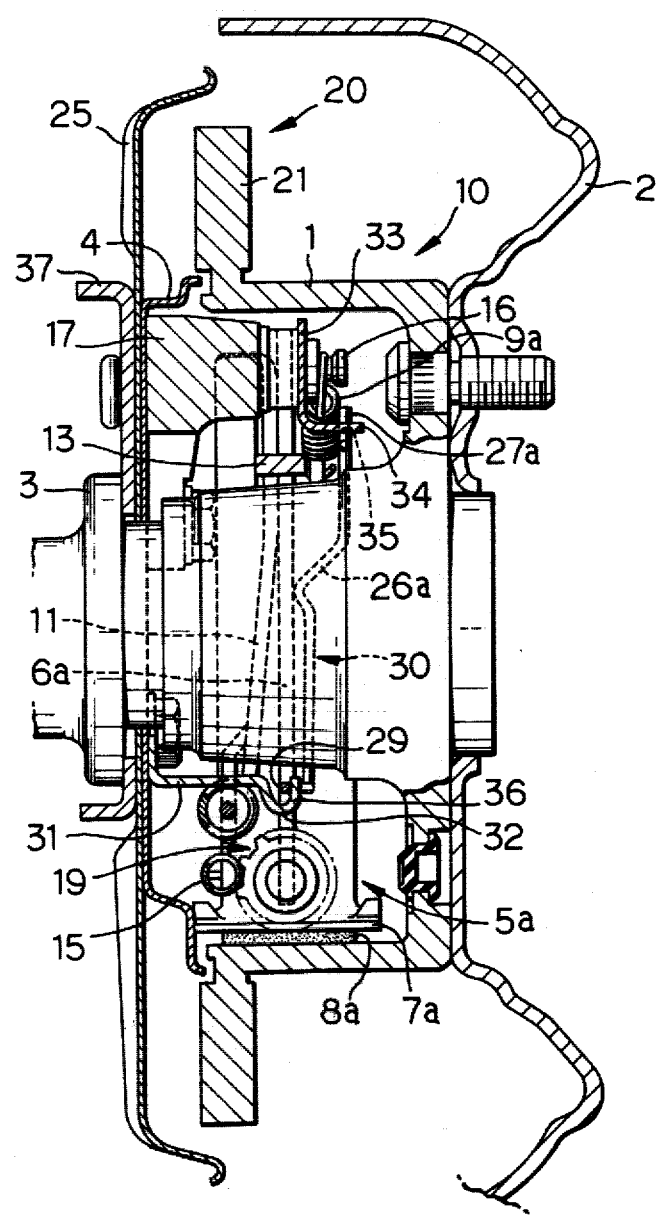
FIG. 2 is an axial sectional view of the brake shown in FIG. 1.

A drum-in disc brake shown in FIGS. 1 and 2 is composed of a drum brake portion 10 and a disc brake portion 20.

The disc brake portion 20 is concentrically formed with a disc wheel 2 and includes a disc rotor 21 integrally rotatable with a disc wheel 2 and a caliper assembly 23 which is carried, movably in the axial direction of the disc rotor 21, by a caliper retainer 14 secured to an attaching plate 37 with a bolt 38. The caliper assembly 23 is provided with a hydraulic cylinder (not shown) for urging a pair of braking pad assemblies held by the caliper retainer 14 onto either surface of the disc rotor 21.

The drum brake portion 10 is, on the other hand, provided with a brake drum 1 of cylindrical form having a bottom, which is integrally formed with, in the central portion of, the disc rotor 21. This brake drum 1 is, in FIG. 1, removed so as to show the interior more clearly, and shown with a two-dot-chain line only to indicate the location thereof. On an axle hub 3 located adjacent to an opening of the brake drum 1, a backing plate 4 of circular plate form with an opening in the central portion thereof is unrotatably secured, and is made integral with the attaching plate 37 and a dust cover 25.

On the hub 3 a bracket 17 is, via the backing plate 4, secured, which an anchor pin 16 is in turn fitted into. A pair of shoes 5a and 5b are disposed on either side of the anchor pin 17 situated inbetween. The shoe 5a (5b) consists of a web 6a (6b) of arcuate form, a rim 7a (7b) perpendicularly attached on the outskirt of the web 6a (6b), and a lining 8a (8b) stuck to the outer surface of the rim 7a (7b). The upper end (a first end) of the web 6a (6b) is abutted to the lateral side of the anchor pin 16.

The lower end (a second end) of the web 6a (6b) is, on the other hand, mutually connected by an adjusting screw 19, which is with a recess formed on an end member 18a (18b) on either end of the adjusting screw 19 in engagement with the lower end of the web 6a (6b) respectively. The length of the adjusting screw 19, i.e., the distance between both lower ends of the web 6a (6b), can be adjusted, longer or shorter, by rotation of an adjusting wheel 15 disposed in the middle thereof.

Between the upper end of each shoe 5a (5b) and the anchor pin 16 a return spring 9a (9b) is anchored, for urging each end of the shoes to abut on the lateral side of the anchor pin 16. In the neighborhood of the lower end of both shoes 5a, 5b a tension coil spring 24 is spanned in parallel to the adjusting screw 19.

In the vicinity of the upper end of the web 6a of one shoe 5a a parking lever 11 is pivoted with a pin 12. The parking lever 11 is near the pin 12 engaged with a notch formed on one end of a strut 13. As a notch on the other end of the strut 13 is engaged with a notch on the web 6b of the other shoe 5b, a force applied in the arrow A direction on the free end of the parking lever 11 functions, with the aid of the strut 13, to widen the distance between both upper ends of the shoes 5a, 5b, that is to say the parking brake operation.

On the backing plate 4 a retainer or bracket 31 is erected in the neighborhood of the adjusting screw 19, the end portion of which bracket 31 is wound, once toward the periphery and again toward the center of the drum 1, to form a hook portion 32 almost in U-shape. A certain length of the hook portion 32 is made in the end into a width-narrowed portion 36.

On the anchor pin 16 a retainer or bracket 33 is fixed for forming as a part of it a perpendicularly bent surface 34 faced to the bracket 31. In the surface 34 of the bracket 31 a pair of through-bores 35, 35 are formed. A straight line X—X linking the middle point of the two through-bores 35, 35 and the hook portion 32 constitutes a symmetrical axis for the pair of shoes 5a, 5b by means of so arranging all of the parts concerned.

between the both brackets 31, 33 a show hold-down spring 30 (hereinafter simply called a spring) is mounted. The spring 30 made of an elastic wire member is processed to be nearly circled shaped, being symmetrical to the straight line X—X and made such that both end portions 27a, 27b thereof mutually approach. The end portion 27a (27b) is further bent at a right angle to be fitted into the through-bore 35 (35) respectively for being supported there. The spring 30 is bent or wound into U-shape, at a portion where the straight line X—X passes across, in a direction toward the backing plate 4 and in a plane approximately perpendicular to the backing plate 4, in order to form an engaging portion 29. The spring 30 is engaged at this engaging portion 29 with the width-narrowed portion 36 of the hook portion 32. The spring 30 is again provided with a pair of acting portions 26a, 26b, made by being formed into U-shape in the direction toward the backing plate 4 at laterally farthest distant symmetrical positions nearly midway between the both end portions 27a, 27b and the engaging portion 29. The acting portions 26a, 26b are aimed at applying a certain urging force to the webs 6a and 6b; and the reaction force against the urging force will be carried by the two brackets 31, 33 which support the spring 30 itself.

In such a way the spring 30 functions to urge the shoes 5a, 5b for holding down the same toward the backing plate 4, i.e., preventing the separation of the shoes 5a, 5b from the backing plate 4.

In installing the spring 30 of the above-mentioned structure, both end portions 27a, 27b are at first fitted into the through-bores 35, 35 respectively, and the engaging portion 29 is afterwards put in the hook portion 32 of the bracket 31 by taking advantage of the elasticity of the spring 30 to deform it slightly in the vicinity of the engaging portion 29 upwards (in the direction toward the center of the brake). The spring 30 is settled, by the above-mentioned putting way in place, in a restricted state to the movement in all directions. The assembling of the spring 30 can therefore be said to be extremely each as understood from the above description.

In the installation of the shoe hold-down spring in case of a drum brake, a problem of how to avoid the interference with the parking lever, with respect of its location, has been discussed so far. The spring 30, in this embodiment, is put along the surface of a web 6a (6b) on the opposite side where the parking lever 11 is located, so there is no need of considering the possibility of interfering with the parking lever 11.

Unlike the conventional way wherein two shoe hold-down springs are provided individually to each of the pair of shoes, with a difficulty of equalizing the load of each shoe hold-down spring, the urging force of the spring 30 in this embodiment on either shoe 5a, 5b is naturally equalized with great advantage, because the spring 30 is symmetrical laterally and the retainers (brackets 31, 33) for the spring 30 do not restrict or restrain the swinging or rotation of the spring 30 about the axis of the symmetry. It is one of great merits of this invention.

Another embodiment is shown in FIGS. 3 and 4, which is characterized in that a roller 40a (40b), for diminishing the friction between the acting portion 26a (26b) and the shoe 5a (5b) shown in FIGS. 1 and 2, is disposed. The best of the device is entirely identical to the previous embodiment; so only the specific features will be described. At laterally symmetrical points of the spring 30, almost in the middle between the end portions 27a, 27b and the engaging portion 29, a pair of rollers 40a and 40b are rotatably fitted on. The direction of the rotational axis of the roller 40a (40b) is so determined as to be nearly agreeable with the moving direction of the web 6a (6b) at the braking operation time, when the roller 40a (40b) is contacted the web 6a (6b). The urging force of the spring 30 is applied to the web 6a (6b) at a predetermined value due to the elasticity of the spring 30, with the roller 40a (40b) being placed in such a state, and the reactionary force against the urging force is carried by the brackets 31, 33 which support the spring 30 (see FIGS. 1 and 2).

The spring 30 shown in FIG. 4 is curved or stepped on either side of the roller 40a (the situation is just the same in 40b) to make the spring wound like a step. This way of stepping the spring is helpful in absorbing the difference of the distance from the backing plate 4 of both brackets 31, 33 at the spring carrying position and positioning in place the roller 40a (40b). The roller 40a (40b) is usually fitted on the spring in the process of bending, but it may be made of a pair of splitted halves cut by a plane including the axis of the roller and both halves are stuck together with the spring inbetween for facilitating the assemblying thereof. It is also preferable to dispose a pair of ring members 41, 41 on either side of the roller 40a (40b) in a justly sandwiched manner in order to make the rotation of the roller 40a (40b) smooth, as shown in FIG. 5.

The spring 30 urges in this way the brake shoe 5a (5b) by way of the roller 40a (40b) toward the backing plate 4 for holding down the brake shoe 5a (5b) preventing its floating or separating from the backing plate 4. The roller 40a (40b) is extremely helpful in diminishing the friction resistance of the shoe 5a (5b), through its rolling movement, when the shoe 5a (5b) is shifted by the braking operation. It is also useful in improving the returning movement of the shoe 5a (5b) when the brake is released, and in preventing the so-called dragging of the shoe 5a (5b) which may be caused by the mutual action of the elastic deformation of the spring 30 in the parallel direction to the backing plate 4 and the sliding friction resistance between the spring 30 and the shoe 5a (5b).

It is a great characteristic of this invention that the spring 30 is made laterally symmetrical and easily rotatable or swingable about the symmetrical axis, because the retainers for the spring 30 are all concentrated to the vicinity of the symmetrical axis for that purpose. This fact is very significant in equalizing the urging force of the rollers 40a and 40b to the shoes 5a and 5b on both sides.

The shape of the brackets 31, 33 which are used as the retainers of the spring 30 in the above embodiments are variable in many ways according to the relation with the environmental members. Any improvements and modifications do not depart from the spirit and scope of the invention in this respect.

Still another embodiment will be described with reference to FIG. 6. In contrast to the spring 30 of nearly circular form, a shoe hold-down spring 50 in this case is of almost half circular form (this will be called again simply spring). The spring 50 is made of one elastic wire member and bent into U-shape in the middle portion thereof toward the outer periphery of the drum, and again turned back toward the center thereof to form an engaging portion 53 there. In the vicinity of the opening of the U-shape engaging portion 53, a pair of arcuate form recesses 51a, 51b are formed inside the U-shape engaging portion 53 so as to embrace a cylindrical member. The spring 50 further extends respectively along the brake shoe 5a, 5b and symmetrically to the axis X—X, nearly to the central portion of the shoe 5a, 5b so as to rotatably hold a roller 40a and 40b at each end portion thereof.

In installing the spring 50, a bottom of the U-shape engaging portion 53 is fitted on a stepped member 52, erected on the backing plate 4 (see FIGS. 1 and 2), at a small-diametered neck portion thereof, and both recesses 51a and 51b are engaged with the anchor pin 16 by a snap action due to the elastic deformation of the engaging portion 53. That is, both recesses 51a and 51b are forcibly opened by abutting the cylindrical portion of the anchor pin 16 for embracing the anchor pin 16 in them. The spring 50 can be settled under restriction of movement in all directions through the engagement with the stepped member 52 and the anchor pin 16, while applying urging force, via the rollers 40a (40b), to the shoe 5a (5b) and diminishing sliding friction resistance on the other hand, just similarly to the earlier stated embodiments.

This embodiment is specifically effective in making the design of the shoe hold-down spring compact, while avoiding the interference with other parts of the brake, because the spring 50 of a wire member can be settled by only fitting the middle portion thereof to the retainers such as the stepped member 52 and the anchor pin 16 due to its own elasticity, and it can be disposed in the upper half only of the brake system, leaving the lower half thereof untouched or clear.

What is claimed is:

1. In a drum brake wherein a pair of shoes of arcuate shape retained by a stationary backing plate are expanded by actuating means for being slidably abutted onto an internal surface of a rotatable drum so as to restrain the rotation of said drum, a shoe hold-down device for preventing said pair of shoes from rising up from said backing plate, and shoe hold-down device comprising:
   a spring of an elastic wire member made into nearly circled-shape symmetrical to an axis, with both ends being adjacent to each other;
   retaining means for retaining said spring in a substantially not hampering state from swinging about said axis, said retaining means consisting of a first retainer which retains both ends of the spring and a second retainer which retains the central portion of the spring, and said first retainer and said second retainer being respectively secured to said backing plate in the vicinity of one of a first position where each one end of the pair of shoe webs are mutually neighboring and a second position where each the other end of the pair of shoe webs are mutually neighboring;
   said spring being allowed to urge each web of said pair of shoes toward said backing plate with equal resilient urging force, at a pair of farthest distant symmetrical positions from said axis and by acting on said each web of said pair of shoes on a surface not facing said backing plate.

2. A shoe hold-down device in accordance with claim 1, wherein said both ends of said spring are formed substantially parallel to said axis, and each of said both ends is respectively fitted into one of a pair of through-bores formed in close vicinity in said first retainer.

3. A shoe hold-down device in accordance with claim 2, wherein said second retainer is engaged with said spring, with a hook portion thereof which is open toward the direction identical to that whereto said both ends of the spring are directed, so as to prevent said both ends from getting out of the through-bores.

4. A shoe hold-down device in accordance with claim 1, wherein a pair of rollers are rotatably attached to said spring at places where said spring acts on both webs of said pair of shoes with the object of diminishing friction between said spring and said both webs.

5. A shoe hold-down device in accordance with claim 4, wherein said pair of rollers are prevented from movement in the axial direction of said spring by means of a pair of step portions formed in the wire member constituting said spring on both sides of said rollers, which are shaped by bending the wire member at right angle at each bending place.

6. A shoe hold-down device in accordance with claim 5, wherein a ring member is disposed respectively between the step portion and each end surface of said rollers for making the rotation of the rollers smooth.

7. A shoe hold-down device in accordance with claim 4, wherein said rollers are being made of a pair of splitted halves cut by a plane including the axis of the roller and both halves are stuck together with the spring inbetween.

8. In a drum brake wherein a pair of shoes of arcuate shape retained by a stationary backing plate are expanded by actuating means for being slidably abutted onto an internal surface of a rotatable drum so as to restrain the rotation of said drum, a shoe hold-down for preventing said pair of shoes from rising up from said backing plate, said shoe hold-down device comprising:
   a spring of an elastic wire member made into symmetrical form to an axis and provided with an engaging portion of U-shape in the central portion thereof, said engaging portion being provided with a pair of recesses facing each other in the vicinity of an opening of the U-shape;
   retaining means for retaining said spring at the central portion thereof in a substantially not hampering state from swinging about said axis, said retaining means including a pin secured to said backing plate;
   said pair of recesses of said U-shape engaging portion being engaged with said pin by a snap action due to the elastic deformation of said U-shaped engaging portion; and
   said spring being allowed to urge each web of said pair of shoes toward said backing plate with equal resilient urging force, at both farthest distant symmetrical ends thereof from said axis and by acting on said each web of said pair of shoes on a surface not facing said backing plate.

9. A shoe hold-down device in accordance with claim 8, wherein a pair of rollers are rotatably attached to said spring at both ends thereof with the object of diminishing friction between said spring and said webs.

10. A shoe hold-down device in accordance with claim 8, wherein said spring is further engaged at a bottom of said U-shape with a small diametered neck portion of a stepped member erected on said backing plate.

11. A shoe hold-down device in accordance with claim 8, wherein said pin is an anchor pin on lateral sides of which are respectively abutted each one end of said pair of shoes.

* * * * *